United States Patent
Veilleux, Jr.

(10) Patent No.: US 9,823,030 B2
(45) Date of Patent: Nov. 21, 2017

(54) HEATED BYPASS VALVE FOR HEAT EXCHANGER

(71) Applicant: Hamilton Sundstrand Corporation, Charlotte, NC (US)

(72) Inventor: Leo J. Veilleux, Jr., Wethersfield, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 774 days.

(21) Appl. No.: 14/191,801

(22) Filed: Feb. 27, 2014

(65) Prior Publication Data

US 2015/0048617 A1 Feb. 19, 2015

Related U.S. Application Data

(60) Provisional application No. 61/865,843, filed on Aug. 14, 2013.

(51) Int. Cl.
| | |
|---|---|
| F28F 27/02 | (2006.01) |
| F02C 7/224 | (2006.01) |
| F02C 7/14 | (2006.01) |
| H02K 7/18 | (2006.01) |

(52) U.S. Cl.
CPC ............. *F28F 27/02* (2013.01); *F02C 7/14* (2013.01); *F02C 7/224* (2013.01); *H02K 7/1823* (2013.01); *F05D 2260/213* (2013.01); *Y02T 50/675* (2013.01)

(58) Field of Classification Search
CPC .. F28F 2250/06; F28F 2260/12; F28F 19/006; F28F 27/02; F28F 2265/12; F28D 21/001; F28D 21/0003; F28D 1/0408; F28D 1/0417; F28D 7/0066; F28D 7/0065; F02C 7/14; F02C 7/224; F02C 7/232; F02C 7/236; F02C 7/12; F02C 7/16; F02C 7/22; F02C 9/46; F01D 25/02; F01D 25/10–25/12; F01D 25/18; F05D 2260/213; H02K 7/1823; Y02T 50/6675
See application file for complete search history.

(56) References Cited

U.S. PATENT DOCUMENTS

| | | | |
|---|---|---|---|
| 3,458,414 | A | 7/1969 | Crane et al. |
| 4,041,697 | A | 8/1977 | Coffinberry et al. |
| 4,705,100 | A | 11/1987 | Black et al. |

(Continued)

FOREIGN PATENT DOCUMENTS

EP 1329617 A2 7/2003

OTHER PUBLICATIONS

Extended European Search Report from EP Application Serial No. 14180601.8, dated Jan. 7, 2015, 6 pages.

*Primary Examiner* — William H Rodriguez
*Assistant Examiner* — Jason H Duger
(74) *Attorney, Agent, or Firm* — Kinney & Lange, P.A.

(57) ABSTRACT

A heat exchanger bypass system comprises a liquid circuit, a first fluid circuit, a second fluid circuit, a first heat exchanger, a second heat exchanger, a liquid bypass line and a heated bypass valve. The first heat exchanger thermally couples the first fluid circuit to the liquid circuit. The second heat exchanger thermally couples the second fluid circuit to the liquid circuit. The liquid bypass line circumvents the first heat exchanger. The heated bypass valve controls flow through the liquid bypass line.

13 Claims, 3 Drawing Sheets

(56) References Cited

U.S. PATENT DOCUMENTS

| | | | |
|---|---|---|---|
| 4,741,152 A * | 5/1988 | Burr | F01D 25/18 |
| | | | 60/39.08 |
| 4,776,536 A | 10/1988 | Hudson et al. | |
| 6,182,749 B1 * | 2/2001 | Brost | F01M 5/007 |
| | | | 123/196 AB |
| 6,584,777 B1 | 7/2003 | Clarke | |
| 6,651,441 B2 | 11/2003 | Reuter et al. | |
| 7,997,062 B2 * | 8/2011 | Sun | F01D 25/18 |
| | | | 60/266 |
| 8,132,398 B2 * | 3/2012 | Wang | F02C 7/14 |
| | | | 60/39.281 |
| 2010/0186943 A1 | 7/2010 | Sun et al. | |
| 2012/0048530 A1 * | 3/2012 | Hagshenas | F01M 5/00 |
| | | | 165/285 |
| 2012/0324859 A1 | 12/2012 | Foster | |
| 2013/0036722 A1 | 2/2013 | Hashenas et al. | |

* cited by examiner

HEATED BYPASS VALVE FOR HEAT EXCHANGER

CROSS-REFERENCE TO RELATED APPLICATION

This application claims priority to U.S. Provisional Application No. 61/865,843, filed on Aug. 14, 2013, and entitled "Heated Bypass Valve for Heat Exchanger," the disclosure of which is incorporated by reference in its entirety.

BACKGROUND

The present disclosure relates generally to fuel and oil systems for aircraft systems and more particularly to bypass valves for heat exchangers.

Gas turbine engines operate during varied environmental conditions, including at temperatures below the freezing point of water. Additionally, it is possible for fuel to absorb water under various conditions. Thus, under certain conditions it is possible for ice to form within the fuel system. For example, intercontinental flights at high altitudes, such as from Beijing to London, frequently produce conditions for icing. Ice crystals may also form under certain conditions before the engine is operating, such as when in hangars or on airstrips. The ice crystals can plug fuel lines and orifices in the fuel system, which may degrade performance of the gas turbine engine or even cause an engine stall. As such, gas turbine engines are equipped with systems for eliminating or removing ice particles from fuel lines. For example, heat exchangers are often provided just before the fuel pump to eliminate any ice crystals. Heat exchangers are desirable because the ice is removed from the system altogether and does not require periodic clearing or cleaning.

Typical ice removal systems comprise a heat exchanger that imparts heat to the fuel from engine oil used to cool various components of the engine. However, such systems require time for the engine oil to heat up, thereby delaying the melting of any ice crystals. Furthermore, at high altitude conditions the heat exchanger may not be able to extract adequate heat from the heat source, such as the electric generator oil or engine oil, to melt the ice. Thus, in the event the heat exchanger becomes clogged with ice to the point where free flow of fuel is inhibited, a bypass valve opens causing the fuel to circumvent the heat exchanger. The bypass flow of fuel keeps the engine running until such time the problem can be rectified by other means or the aircraft can be landed. However, the bypass valve itself produces a potential bottleneck that can become clogged with ice. There is, therefore, a need for improved systems for preventing ice blockage within fuel systems.

SUMMARY

The present invention is directed to a heat exchanger bypass system, such as may be used in a fuel and oil system for a gas turbine engine. The heat exchanger bypass system comprises a liquid circuit, a first fluid circuit, a second fluid circuit, a first heat exchanger, a second heat exchanger, a liquid bypass line and a heated bypass valve. The first heat exchanger thermally couples the first fluid circuit to the liquid circuit. The second heat exchanger thermally couples the second fluid circuit to the liquid circuit. The liquid bypass line circumvents the first heat exchanger. The heated bypass valve controls flow through the liquid bypass line.

DETAILED DESCRIPTION

Figure 1A:
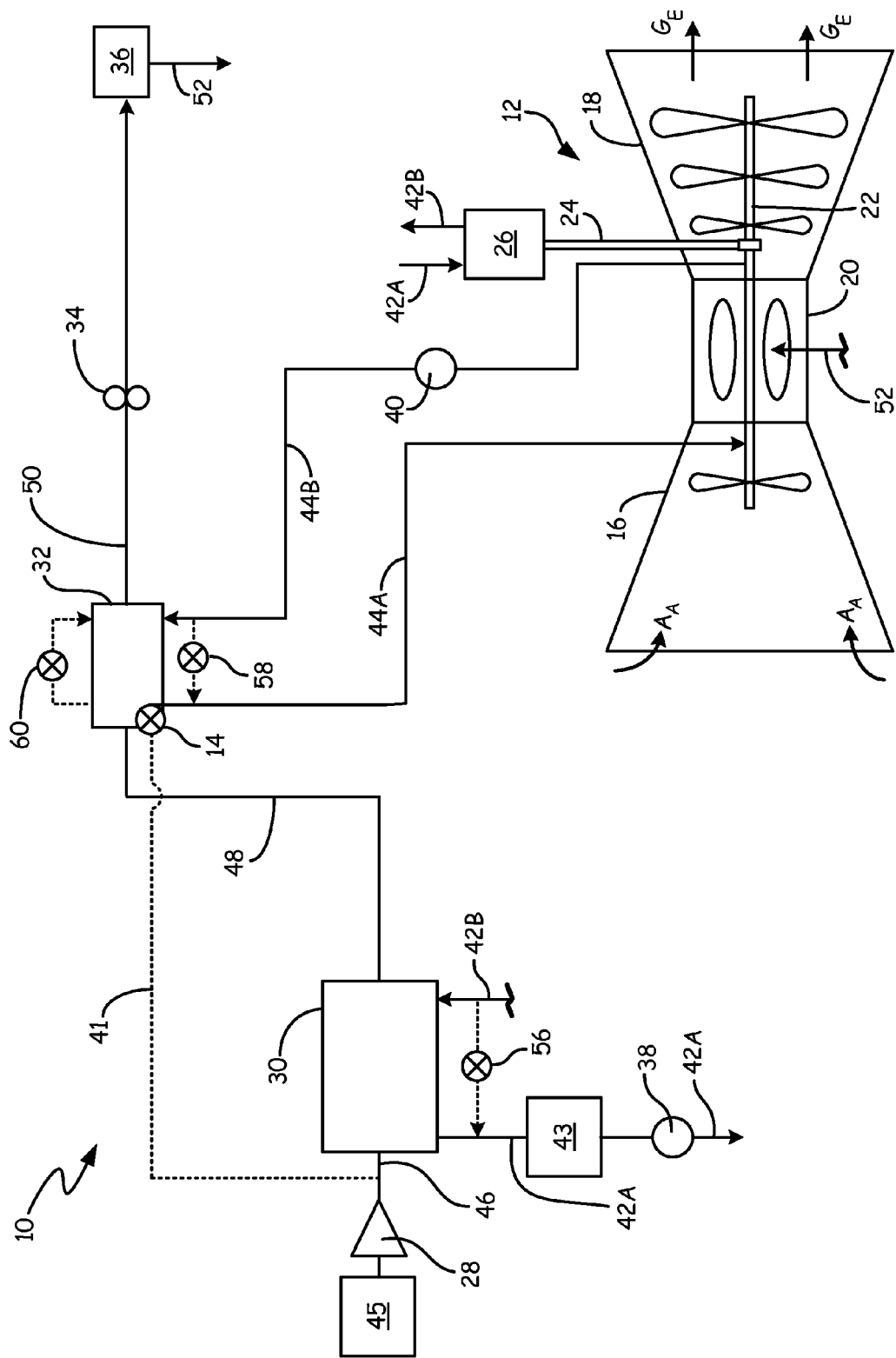
FIG. 1A is a schematic for a fuel and oil system of a gas turbine engine showing heat exchangers connected with a heated bypass valve in a closed state.

FIG. 1A shows a portion of a fuel and oil system 10 for gas turbine engine 12 with heated bypass valve 14. Gas turbine engine 12 includes compressor 16, turbine 18, combustor 20, turbine shaft 22, generator shaft 24 and generator 26. Fuel and oil system 10 includes boost pump 28, generator heat exchanger 30, engine heat exchanger 32, fuel pump 34, fuel metering unit (FMU) 36, first oil pump 38 and second oil pump 40.

In the configuration of FIG. 1A, heated bypass valve 14 is closed such that direct flow between boost pump 28 and engine heat exchanger 32 through bypass line 41 is prevented (as indicated by a dashed line in FIG. 1A). As discussed with reference to FIG. 1B, heated bypass valve 14 can be opened to bypass generator heat exchanger 30 in the event fuel within generator heat exchanger becomes blocked with ice and flow of fuel through line 48 is prevented (as indicated by a dashed line in FIG. 1B). Engine heat exchanger 32 heats bypass valve 14 to prevent formation of ice within bypass valve 14.

A lubricant, such as oil, is stored within fuel and oil system 10, such as in oil tank 43, and is provided to generator 26 and shaft 22. Using pump 38, oil from generator heat exchanger 30 is pumped to generator 26 through line 42A and subsequently pumped to generator heat exchanger 30 through line 42B. Likewise, oil from engine heat exchanger 32 is provided to shaft 22 through oil line 44A, and oil is returned to engine heat exchanger 32 through line 44B using pump 40. In the disclosed embodiment, oil tank 43 is disposed within line 42A and, although not shown, line 44A may also be connected to the same or a different oil tank. Likewise, in the disclosed embodiment, pumps 38 and 40 are shown being placed in lines 42A and 44B, respectively, but may be located in other locations.

Boost pump 28 receives fuel from fuel tank 45, and delivers fuel to fuel line 46, which routes fuel to generator heat exchanger 30. Fuel line 48 connects generator heat exchanger 30 and engine heat exchanger 32. Outlet line 50 routes fuel to FMU 36, which provides fuel to combustor 20 through fuel line 52.

Gas turbine engine 12 operates in a conventional manner by combusting fuel from FMU 36 and compressed air from compressor 16 in combustor 20 to produce high energy gases for driving turbine 18. Compressor 16 draws in ambient air $A_A$, compresses it and provides it to combustor 20. Boost pump 28 pushes fuel through generator heat exchanger 30 and engine heat exchanger 32 to fuel pump 34. Fuel pump 34 provides pressurized fuel to FMU 36, which is electronically controlled, such as through a Full Authority Digital Engine Controller (FADEC), to deliver precise amounts of fuel to combustor 20 based on performance needs of gas turbine engine 12. Fuel not needed by combustor 20 is returned to the fuel system via appropriate fuel lines (not shown).

Combustor 20 includes fuel injectors and igniters for burning a mixture of fuel and air to provide exhaust gas $G_E$ that turns turbine 18. Rotation of turbine 18 drives shaft 22, which rotates compressor 16. In addition to driving operation gas turbine engine 12, rotation of engine shaft 22 causes generator shaft 26 to rotate and provide a mechanical input to electrical generator 26. Electrical generator 26 is shown schematically being driven by tower shaft 24, which is coupled to shaft 22 through a gearbox, as is known in the art.

Aside from exhaust gas $G_E$, operation of gas turbine engine 12 produces heat, particularly in bearings used to support shaft 22 and within generator 26 itself. Thus, generator 26 and the bearings for shaft 22 typically require lubrication to remove heat. Generator heat exchanger 30 and engine heat exchanger 32 are interconnected with fuel lines and oil lines to transfer heat generated by generator 26 and shaft 22 to the fuel. The oil is thereby cooled and the heated fuel improves operating efficiency of gas turbine engine 12 and prevents formation of ice within the fuel lines.

Heat exchangers 30 and 32 each receive a motive flow of heated oil and a motive flow of relatively cooler fuel. Pump 38 circulates a continuous flow of heated oil from generator 26 to generator heat exchanger 30 through line 42B. Pump 40 circulates a continuous flow of heated oil from the bearings for shaft 22 (or oil sumps within engine 12 that collect oil from the bearings) to engine heat exchanger 32 through line 44B. Colder fuel from boost pump 28 flows through heat exchangers 30 and 32.

Heat exchangers 30 and 32 transfer heat from the oil to the fuel. Oil cooled in engine heat exchanger 32 is returned to shaft 22 via line 44A. Oil cooled in generator heat exchanger 30 is returned to generator 26 via line 42A. Heated fuel is consumed within combustor 20. As such, heat from fuel and oil system 10 is continuously removed from the oil by the fuel and removed from engine 12 by burning of the fuel.

Heat exchangers 30 and 32 are connected in series and cold fuel is heated incrementally at each of heat exchangers 30 and 32. Generator heat exchanger 30 is positioned upstream (relative to the flow direction of the fuel) of engine heat exchanger 32. Series placement of generator heat exchanger 30 and engine heat exchanger 32 is desirable because it maintains the flow velocity of the fuel and maximizes heat transfer, as opposed to parallel flow heat exchangers where flow velocity is reduced. In series connected heat exchangers, oil used to cool the bearings for shaft 22 reaches higher temperatures than the oil used to cool generator 26. Configured as such, the coldest fuel cools generator 26 in order to reduce overheating of generator 26 and loss of electrical power to gas turbine engine 12. It is, thus, highly desirable to keep fuel running through system 10 under all conditions to, among other things, prevent overheating of generator 26.

As shown in FIG. 1A, fuel is allowed to flow from generator heat exchanger 30 to engine heat exchanger 32 through fuel line 48. With bypass valve 14 closed, fuel flows uninterruptedly from fuel tank 45, through boost pump 28, inlet line 46, generator heat exchanger 30, line 48, engine heat exchanger 32, line 50 and pump 34 to FMU 36. Thus, engine 12 operates under normal conditions.

If atmospheric conditions become sufficient, water within the fuel will become frozen into ice particles, even though generator heat exchanger 30 operates to heat the fuel. Small amounts of ice within system 10 may be tolerated. It is, however, desirable to prevent formation of ice within system 10 altogether. Thus, under normal operating conditions operation of heat exchangers 30 and 32 is sufficient to prevent the formation of ice.

Under more extreme atmospheric temperatures and altitudes, ice may still form in the fuel. Enough ice may form to cause blockage of heat exchanger 30 and prevent fuel from being delivered to combustor 20, which is highly undesirable due to the potential to stall operation of engine 12. Bypass valve 14 is operable to allow fuel to circumvent generator heat exchanger 30 and flow directly from boost pump 28 to engine heat exchanger 32.

Figure 1B:
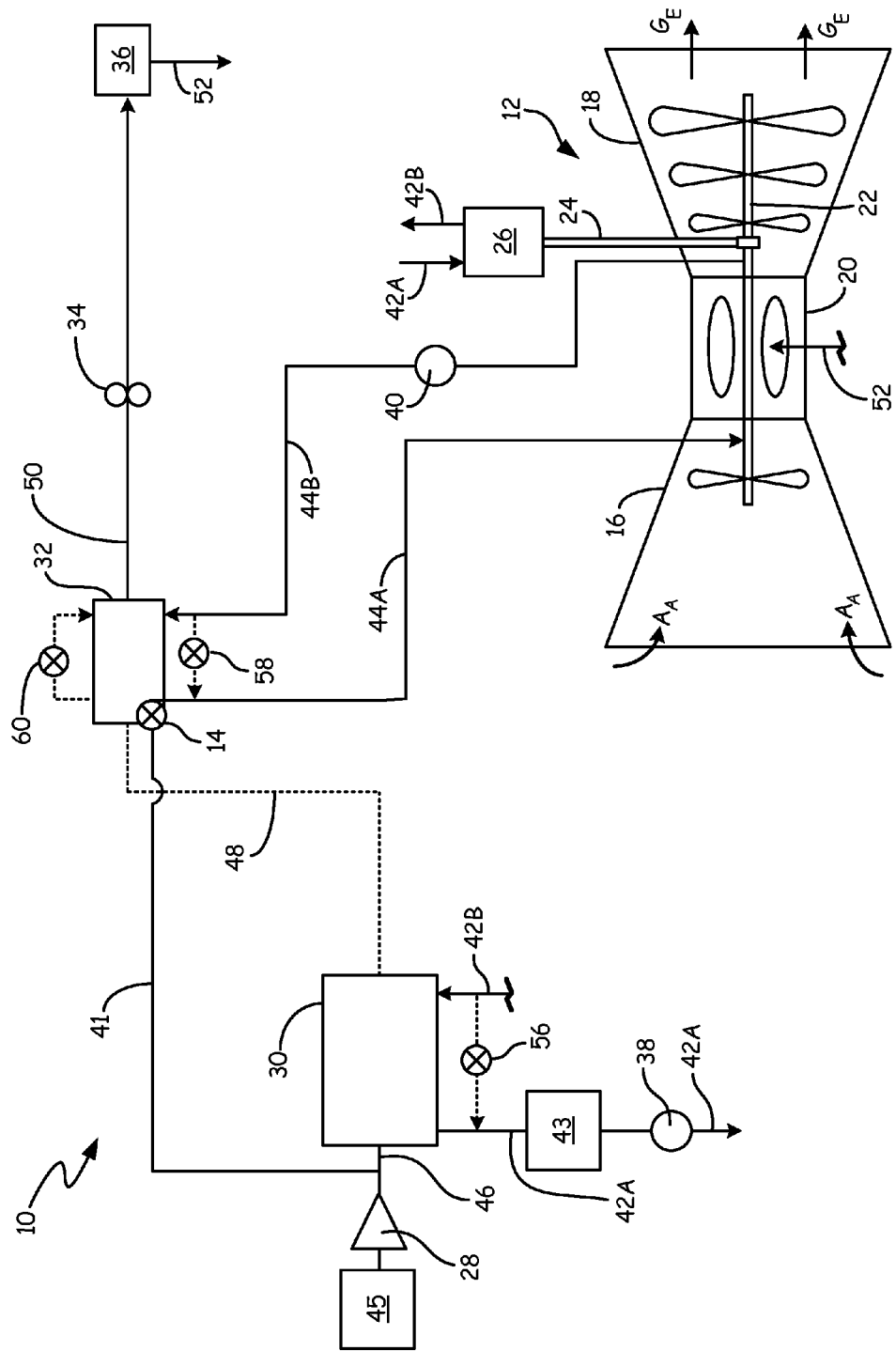
FIG. 1B shows the schematic for a fuel and oil system of a gas turbine engine of FIG. 1A with the heated bypass valve in an open state.

FIG. 1B shows fuel and oil system 10 for gas turbine engine 12 of FIG. 1A with heated bypass valve 14 in an open state to allow fuel flow through bypass line 41. FIG. 1B additionally shows oil bypass valves 56 and 58 and fuel bypass valve 60. As indicated by a dashed line in FIG. 1B, fuel is prevented from flowing through fuel line 48 by clogging of ice within generator heat exchanger 30.

Bypass valve 14 is responsive to pressure differentials across generator heat exchanger 30. Specifically, when the pressure in bypass line 41 becomes greater than the pressure in line 50 beyond a threshold pressure, bypass valve 14 will open. Pressure in bypass line 41 increases as ice within generator heat exchanger 30 reduces flow through heat exchanger 30 and increases the backpressure in line 46. The location of bypass valve 14 in close proximity to heat generated by engine heat exchanger 32 inhibits ice from forming within bypass valve 14.

Bypass valve 14 will open to allow fuel to flow through bypass line 41. Heat from oil within engine heat exchanger 32 is used to heat bypass valve 14 to prevent ice particles within the fuel from clogging bypass valve 14. The heat emitted from heat exchanger 32 increases the temperature of the fuel within valve 14 to temperatures sufficiently high so as to be able to melt ice crystals within the fuel and to prevent ice crystals from clogging heat exchanger 32. Thus, the risk of ice crystals clogging fuel lines 50 and 52 and small orifices within fuel pump 34 and combustor 20 is mitigated, thereby increasing the operating efficiency and safety of gas turbine engine 12. As will be discussed in greater detail with reference to FIG. 2, bypass valve 14 may be positioned anywhere to allow the heat from engine heat exchanger 32 to impart heat into valve 14 sufficient to melt ice. In the event ice crystals do form within heat exchanger 32 sufficient to cause blockage, bypass valve 60 can be opened to allow fuel to bypass heat exchanger 32.

Continuous flow of heated oil from generator 26 will flow into generator heat exchanger 30 through line 42B to melt the ice forming the blockage. After enough ice has melted to allow flow through heat exchanger 30 and the pressure within bypass line 41 to drop, bypass valve 14 will close and fuel flow through line 48 will be restored. Flow of oil through generator heat exchanger 30 may be bypassed by valve 56. Similarly, flow of oil through engine heat exchanger 32 may be bypassed by valve 58. Operation of valves 56 and 58 may be manually closed for service or may be automatically closed by the FADEC based on engine conditions.

Figure 2:
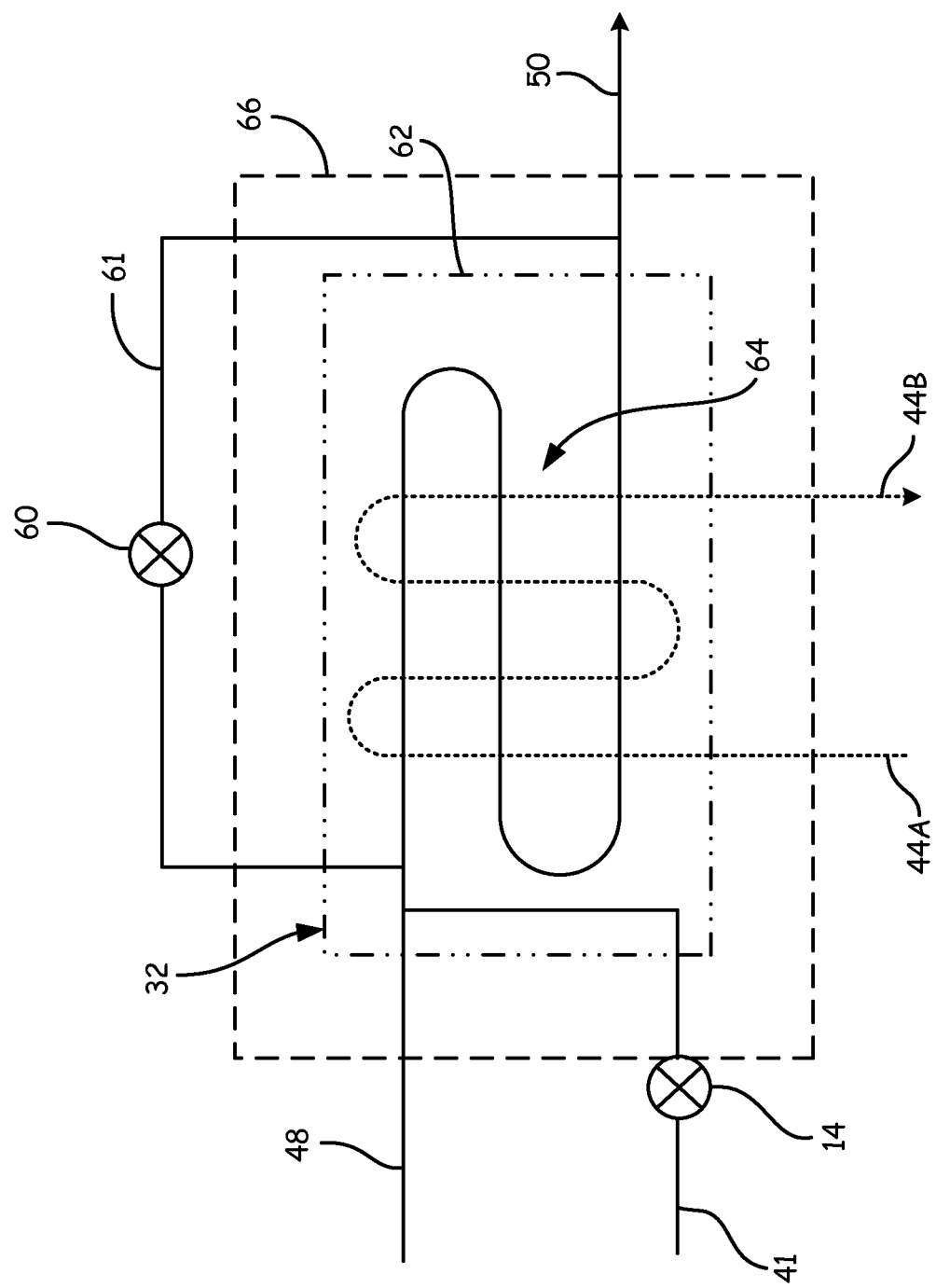
FIG. 2 shows a schematic view of a heat exchanger connected to the heated bypass valve of FIGS. 1A and 1B.

FIG. 2 shows a schematic view of engine heat exchanger 32 connected to heated bypass valve 14 of FIGS. 1A and 1B. Engine heat exchanger 32 includes bypass valve 14, bypass line 41, oil input line 44A, oil output line 44B, fuel input line 48, fuel output line 50, bypass line 61, housing 62 and heat exchange mechanism 64.

Fuel input line 48 delivers cool fuel to heat exchange mechanism 64 while oil input line 44A delivers hot oil to heat exchange mechanism 64. Heat exchange mechanism 64 transfers heat from the oil to the fuel. Heat exchange mechanism 64 may comprise any suitable heat transfer mechanism as is known in the art. For example, heat exchangers 30 and 32 may comprise dual-fluid plate-fin or shell-and-tube heat exchangers.

Heat exchange mechanism 64 is disposed within housing 62, which also provides a framework for mounting the components of heat exchanger 32. For example, fuel line 48, bypass line 41, oil lines 44A and 44B and bypass line 61 may pass through housing 62 to join with heat exchange mechanism 64. As mentioned above, bypass valve 14 may be positioned anywhere near heat exchanger 32 where there is sufficient heat to melt ice within bypass valve 14. As explained earlier, bearings for engine shaft 22 generate much higher heat than does generator 26. Thus, heat exchanger 32 may be able to melt ice that heat exchanger 30 was unable to melt. Additionally, due to the extremely elevated temperatures of the oil used to cool bearings for shaft 22, engine heat exchanger 32 produces heat zone 66. As such, bypass valve 14 may be positioned outside of heat exchanger 32 anywhere within heating zone 66 where there is sufficient heat to melt ice. In the embodiment depicted, bypass valve is attached to the outside of housing 62 within heat zone 66 so as to be in thermal communication with heat from the oil. In other embodiments, bypass valve 14 may be attached to the inside of housing 62 or anywhere within bypass line 41 between housing 62 and input line 48 in thermal communication with heat from the oil. In yet other embodiments, bypass valve 14 can be heated more directly from the heat of oil used to cool and lubricate the bearings of shaft 22. For example, bypass valve 14 could be thermally coupled to line 44A, line 44B, pump 40, an oil sump or another component having heated bearing oil, rather than being coupled to heat exchanger 32.

Engine heat exchanger 32 also includes bypass valve 60 which is disposed within bypass line 61. Bypass line 61 forms a secondary fuel bypass circuit around heat exchange mechanism 64 in the event heat from oil within oil lines 44A and 44B is insufficient to melt ice within the fuel. Bypass line 61 extends from fuel line 48 downstream of bypass line 41 and bypass valve 14 to fuel outlet line 50 downstream of heat exchange mechanism 64. Thus, fuel including frozen ice particles may travel from boost pump 28 (FIG. 1A) to fuel pump 34 (FIG. 1A) without passing through heat exchangers 30 or 32. Bypass valve 60 may be sized accordingly to allow large ice crystals to pass through without clogging the valve mechanism. Such a condition is undesirable, but may provide fuel to engine 12 for a time sufficient for heat exchangers 30 and 32 to melt ice blocking the heat exchangers.

By using the heat of oil used to cool and lubricate bearings within engine 12, which is typically much higher than the heat of generator heat exchanger 30, blockage of generator heat exchanger 30 can be mitigated. For example, the presence of an unheated bypass valve around the heat exchange mechanism of heat exchanger 30 is eliminated. This eliminates a potential choke point for ice particles within the system. Thus, flow of fuel can never be completely choked off at generator heat exchanger 30. The elevated heat from engine heat exchanger 32 will always be available within the system to melt ice, whether it is blocking generator heat exchanger 30 or engine heat exchanger 32. Heat from oil engine bearings is conveniently accessed at engine heat exchanger 32, which is typically positioned in close proximity to heat exchanger 30 and input line 48.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger bypass system comprising:
   a liquid circuit;
   a first fluid circuit;
   a second fluid circuit;
   a first heat exchanger thermally coupling the first fluid circuit to the liquid circuit;
   a second heat exchanger thermally coupling the second fluid circuit to the liquid circuit, wherein the first and second heat exchangers are connected in series with the first heat exchanger positioned upstream of the second heat exchanger, and wherein the first fluid circuit has a first fluid temperature at an inlet of the first heat exchanger and the second fluid circuit has a second fluid temperature at an inlet of the second heat exchanger, the second fluid temperature being higher than the first fluid temperature;
   a liquid bypass line circumventing the first heat exchanger, wherein the liquid bypass line extends from a first end upstream of the first heat exchanger to a second end upstream of the second heat exchanger; and
   a bypass valve controlling flow through the liquid bypass line from the first end to the second end, the bypass valve being positioned in thermal contact with the second heat exchanger, and
   wherein the liquid circuit, the first fluid circuit, and the second fluid circuit are configured to be connected to a gas turbine engine.

2. The heat exchanger bypass system of claim 1 wherein:
   the liquid circuit extends from an upstream portion to a downstream portion; and
   the second heat exchanger is coupled to the liquid circuit downstream of the first heat exchanger.

3. The heat exchanger bypass system of claim 1 wherein the bypass valve is positioned in the liquid bypass line.

4. The heat exchanger bypass system of claim 1 wherein the bypass valve is positioned between the liquid bypass line and the second heat exchanger.

5. The heat exchanger bypass system of claim 1 wherein the bypass valve is positioned within the second heat exchanger.

6. The heat exchanger bypass system of claim 1 and further comprising:
   a liquid circuit outlet line extending from an outlet of the second heat exchanger;
   wherein the bypass valve is configured to open when a pressure in the liquid bypass line exceeds a pressure beyond a threshold pressure in the liquid circuit outlet line.

7. The heat exchanger bypass system of claim 1 wherein the bypass valve is configured to open when there is fuel blockage within the first heat exchanger.

8. The heat exchanger bypass system of claim 2 wherein the liquid circuit, the first fluid circuit and the second fluid circuit are connected to the gas turbine engine.

9. The heat exchanger bypass system of claim 8 wherein:
   the liquid circuit comprises a fuel line that delivers fuel to a combustor of the gas turbine engine;

the first fluid circuit comprises an oil line that delivers oil to an electrical generator connected to the gas turbine engine; and the second fluid circuit comprises an oil line that delivers oil to a shaft of the gas turbine engine.

10. A method for heating a bypass valve arrangement in a heat exchanger system, the method comprising:

pumping a flow of liquid fuel through a liquid fuel circuit;

pumping a first flow of oil through a first oil circuit and a first heat exchanger, the first heat exchanger thermally coupling the first oil circuit to the liquid fuel circuit, the first flow of oil in the first oil circuit having a first temperature at an inlet of the first heat exchanger;

pumping a second flow of oil through a second oil circuit and a second heat exchanger, the second heat exchanger thermally coupling the second oil circuit to the liquid fuel circuit, the second flow of oil in the second oil circuit having a second temperature at an inlet of the second heat exchanger, and wherein the second temperature is higher than the first temperature; and wherein the first and second heat exchangers are connected in series with the first heat exchanger positioned upstream of the second heat exchanger, wherein the liquid fuel circuit, the first oil circuit, and the second oil circuit are connected to a gas turbine engine, wherein a liquid fuel bypass line extends from a first end upstream of the first heat exchanger to a second end upstream of the second heat exchanger, the liquid fuel bypass line circumventing the first heat exchanger, and wherein the method further comprises controlling flow of the liquid fuel through the liquid fuel bypass line from the first end to the second end with a bypass valve positioned in thermal contact with the second heat exchanger.

11. The method of claim 10 and further comprising:

opening the bypass valve in response to a blockage within the first heat exchanger.

12. The method of claim 10 wherein:

the first flow of oil is pumped from a generator connected to the gas turbine engine; and the second flow of oil is pumped from a shaft connected to the gas turbine engine.

13. The method of claim 10 and further comprising:

heating the bypass valve with a portion of the second flow of oil that is within the second heat exchanger.

* * * * *